United States Patent [19]

Tong et al.

[11] Patent Number: 5,675,344
[45] Date of Patent: Oct. 7, 1997

[54] METHOD AND APPARATUS FOR LOCATING A MOBILE STATION IN A SPREAD SPECTRUM COMMUNICATION SYSTEM

[75] Inventors: Leon Tong, Naperville; Fuyun Ling, Hoffman Estates, both of Ill.

[73] Assignee: Motorola, Inc., Schaumburg, Ill.

[21] Appl. No.: 671,889

[22] Filed: Jun. 28, 1996

[51] Int. Cl.[6] .................................................. G01S 3/02
[52] U.S. Cl. ................................... 342/457; 455/56.1
[58] Field of Search .......................... 342/457; 455/33.1, 455/56.1; 379/59

[56] References Cited

U.S. PATENT DOCUMENTS 5,363,403  11/1994  Schilling et al. .
5,506,864   4/1996  Schilling ............................ 375/205
5,508,708   4/1996  Ghosh et al. .

*Primary Examiner*—Thomas H. Tarcza
*Assistant Examiner*—Dao L. Phan
*Attorney, Agent, or Firm*—Heather L. Creps

[57] ABSTRACT

The method includes receiving (404) by a first base station (212) a signal (215) transmitted from the mobile station (216); demodulating (406) the signal by the first base station (212) to form a demodulated signal; remodulating (408) at least a portion of the demodulated signal to form a reference signal; receiving (412) by the first base station (212) and a second base station (210, 214) a retransmitted signal (217); comparing (414, 16), by the first base station (212), the retransmitted signal (217) with the reference signal to determine a first delay; comparing (414, 416), by the second base station (210, 214), the retransmitted second signal (217) with the reference signal to determine a second delay; and based on the first and second delays, determining (420) a location of the mobile station (216).

20 Claims, 5 Drawing Sheets

METHOD AND APPARATUS FOR LOCATING A MOBILE STATION IN A SPREAD SPECTRUM COMMUNICATION SYSTEM

FIELD OF THE INVENTION

This invention relates generally to wireless communication systems, and, more particularly, to a method and apparatus for locating a mobile station in a spread spectrum communication system.

BACKGROUND OF THE INVENTION

In a typical wireless communication system such as a digital radio frequency (RF) radiotelephone system, a base station having a controller and a plurality of transmitters and receivers communicates with a mobile station operating within an area served by the base station.

Transmitting a communication signal over an RF channel through a medium such as air causes a received communication signal to significantly differ from an originally transmitted communication signal. As shown in FIG. 1, a transmitted communication signal S(T) 12 may be altered during transmission over a channel by a slowly-changing channel parameter D 14, which represents, for example, a time delay for communication signal S(T) 12 to travel from the mobile station to a base station, and may further be corrupted by a channel variable representing an amount of noise N 16. Thus, a received communication signal R(T) 18 may be represented by an expression such as R(T)=S(T−D) +N.

It is well known that a mobile station's location within the wireless communication system may be determined using a trilateration method. According to the trilateration method, distances between the mobile station and three base stations are calculated based on the measurement of time delay D 14 of a signal traveling between the mobile station and each base station.

Trilateration, however, may be ineffective when one or more base stations do not reliably receive the signal transmitted from the mobile station. For example, in a spread-spectrum system such as a code division multiple access (CDMA) system, when the mobile station is close to one base station, the signal-to-noise (SNR) ratio of the signal received by other base stations may be diminished, often making the measurement of D 14 difficult and inaccurate. Thus, there may be regions within the CDMA system where the mobile station's geographic location cannot be determined, referred to as coverage holes.

There is therefore a need for a method and apparatus for locating a mobile station in a spread spectrum communication system which improves the estimation of time delay D 14 and diminishes coverage holes.

SUMMARY OF THE INVENTION

According to an aspect of the present invention, the foregoing need is addressed by a method for locating a mobile station in a spread spectrum communication system, which includes transmitting a first signal comprising a plurality of transmitted symbols from a first base station to the mobile station; receiving by the first base station from the mobile station a second signal comprising a first plurality of received symbols in response to the first signal; demodulating the second signal by the first base station to form a demodulated signal; reencoding at least a portion of the demodulated signal by the first base station to form a reference signal; receiving the reference signal by a second base station; receiving by the first base station and the second base station a retransmitted second signal comprising a second plurality of received symbols from the mobile station, the retransmitted second signal in response to a retransmitted first signal comprising a plurality of retransmitted symbols directed to the mobile station; comparing, by the first base station, the retransmitted second signal with the reference signal at a first time and at a second time; comparing, by the second base station, the retransmitted second signal with the reference signal at the first time and at the second time; based on the comparisons at the first base station, determining a first delay of the retransmitted second signal, the first delay representing a travel time of the retransmitted second signal from the mobile station to the first base station; based on the comparisons at the second base station, determining a second delay of the retransmitted second signal, the second delay representing a travel time of the retransmitted second signal from the mobile station to the second base station; and based on the first and second delays, determining a location of the mobile station.

According to another aspect of the present invention, a method for locating a mobile station in a spread spectrum communication system includes receiving by a first base station a signal transmitted from the mobile station; demodulating the signal by the first base station to form a demodulated signal; remodulating at least a portion of the demodulated signal to form a reference signal; receiving by the first base station and a second base station a retransmitted signal; comparing, by the first base station, the retransmitted signal with the reference signal to determine a first delay; comparing, by the second base station, the retransmitted second signal with the reference signal to determine a second delay; and based on the first and second delays, determining a location of the mobile station.

According to a further aspect of the present invention, an apparatus for locating a mobile station in a spread spectrum communication system includes a first base station responsive to the mobile station. The first base station includes a first antenna transmitting a first signal to the mobile station. The first antenna receives a second signal from the mobile station in response to the first signal. A first demodulator is responsive to the second signal, producing a demodulated signal. A reencoder is responsive to the demodulated signal, forming a reference signal. A first correlator compares the reference signal to a retransmitted second signal received by the first antenna to determine a first delay, which represents a travel time of the retransmitted second signal from the mobile station to the first base station. A second base station is also responsive to the mobile station and the reference signal. The second base station includes a second antenna receiving the retransmitted second signal from the mobile station and receives the reference signal. A second correlator compares the reference signal to the retransmitted second signal to determine a second delay, which represents a travel time of the retransmitted second signal from the mobile station to the second base station. A controller is responsive to the first and second base stations. The controller determines a location of the mobile station based on the first delay and the second delay.

According to a still further aspect of the present invention, a method for locating a mobile station in a spread spectrum communication system includes receiving by a first base station a signal transmitted by the mobile station, the signal comprising a received frame, the received frame having a plurality of received symbols; storing the signal by the first base station in a first memory; receiving the signal by a second base station; storing the signal by the second base station in a second memory; demodulating the received frame by the first base station to form a demodulated frame; receiving the demodulated frame by the second base station; at the first base station, reencoding the demodulated frame to form a reencoded frame, the reencoded frame having a plurality of encoded symbols; at the second base station, reencoding the demodulated frame to form the reencoded frame; at the first base station, comparing at a first plurality of times each of the plurality of received symbols in the first memory with each of the plurality of reencoded symbols; based on the comparisons at the first plurality of times, determining a first delay representing a travel time of the signal from the mobile station to the first base station; at the second base station, comparing at a second plurality of times each of the plurality of received symbols in the second memory with each of the plurality of reencoded symbols; based on the comparisons at the second plurality of times, determining a second delay representing a travel time of the signal from the mobile station to the second base station; and based on the first and second delays, determining a location of the mobile station.

Advantages of the present invention will become readily apparent to those skilled in the art from the following description of the preferred embodiment of the invention which has been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF PREFERRED EMBODIMENTS

Figure 2:
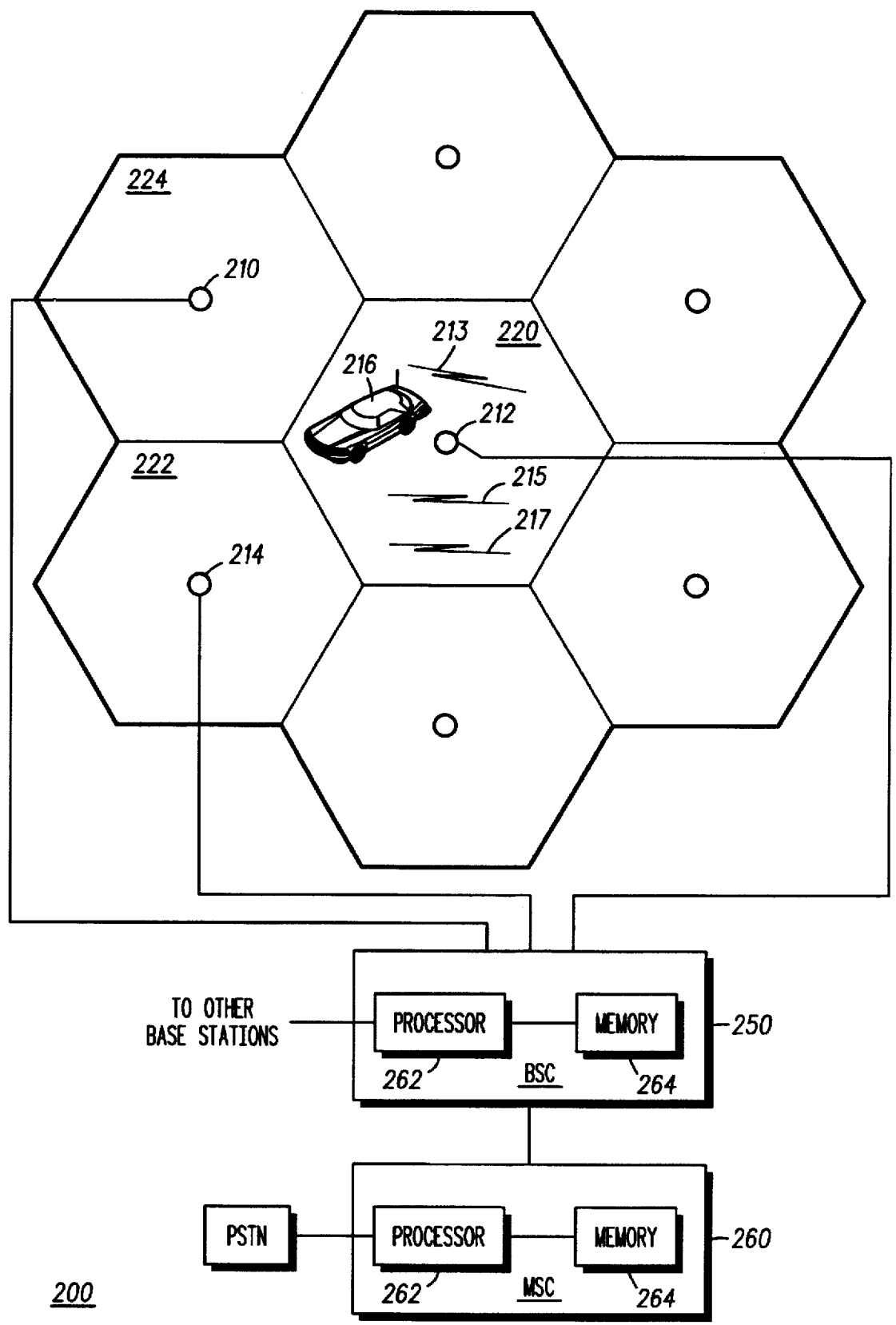
FIG. 2 illustrates a cellular communication system according to a preferred embodiment of the present invention.

Turning now to the drawings, wherein like numerals designate like components, FIG. 2 illustrates a wireless communication system 200, such as a code division multiple access (CDMA) digital radiotelephone system. Base stations 210, 212 and 214 communicate with a mobile station 216 operating within an area 220 served by base station 212. Areas 222 and 224 are served by base stations 214 and 210, respectively. Base stations 210, 212 and 214 are coupled to a base station controller 250, which includes, among other things, a processor 252 and a memory 254, and which is in turn coupled to a mobile switching center 260, also including a processor 262 and a memory 264.

Multiple access wireless communication between base stations 210, 212 and 214 and mobile station 216 occurs via radio frequency (RF) channels which provide physical paths over which digital communication signals such as voice, data and video are transmitted. Base-to-mobile station communications are said to occur on a forward-link channel, while mobile-to-base station communications are referred to as being on a reverse-link channel. A communication system using CDMA channelization is described in detail in TIA/EIA Interim Standard IS-95A, Mobile Station-Base Station Compatibility Standards for Dual-Mode Wideband Spread Spectrum Cellular Systems, Telecommunications Industry Association, Washington, D.C. July 1993[IS-95A], and "TIA Telecommunications Systems Bulletin: Support for 14.4 kbps Data Rate and PCS Interaction for Wideband Spread Spectrum Cellular Systems", February 1996[the Bulletin], both IS-95A and the Bulletin incorporated herein by reference.

As shown in FIG. 2, communication signal 213 has been transmitted on an IS-95 forward-link channel such as a Paging Channel or a traffic channel by base station 212 to mobile station 216. Communication signal 215 has been transmitted via an IS-95 reverse-link channel such as an Access Channel or a traffic channel by mobile station 216 in response to communication signal 213 from base station 212. Communication signal 217 is substantially similar to communication signal 215, communication signal 215 having been re-transmitted by mobile station 216 as communication signal 217.

Figure 1:
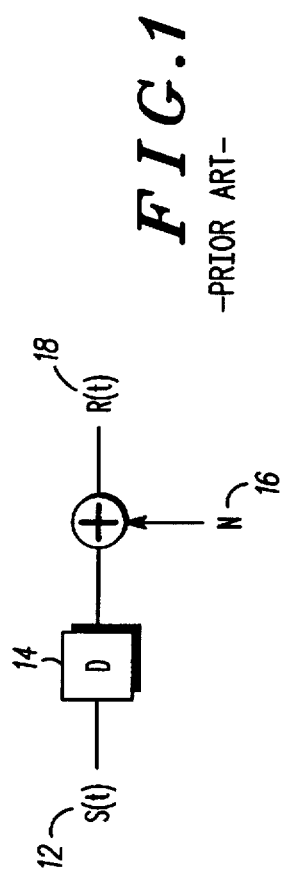
FIG. 1 is an example of a transmitted communication signal S(T) which has been altered during transmission by time delay D and noise N, resulting in received communication signal R(T).

In many applications, such as determining a location of mobile station 216, it may be desirable to estimate time delay D 14 (shown in FIG. 1) for a given S(t) 12 (also shown in FIG. 1), such as communication signals 215, 217, transmitted from mobile station 216 to base station 210, 212 or 214.

For example, time delay D 14 of second signal 215 or of re-transmitted second signal 217 from mobile station 216 to base station 212 may be estimated. As a first step, base station 212 may transmit a first signal 213 to mobile station 216. The first signal may be, for example, a Request Message such as a Status Request Message, transmitted over the Paging Channel, or may be another type of message transmitted over a traffic channel. First signal 213 preferably provides a vehicle for base station 212 to query mobile station 216 about its fixed attributes, such as mobile station's 216 electronic serial number (ESN) and power class. Next, mobile station 216 responds to first signal 213 via a second signal 215, which may be a Status Response Message transmitted over the Access Channel, or via another message transmitted over a traffic channel, so that base station 212 is able to elicit a known data transmission from mobile station 216.

Figure 3:
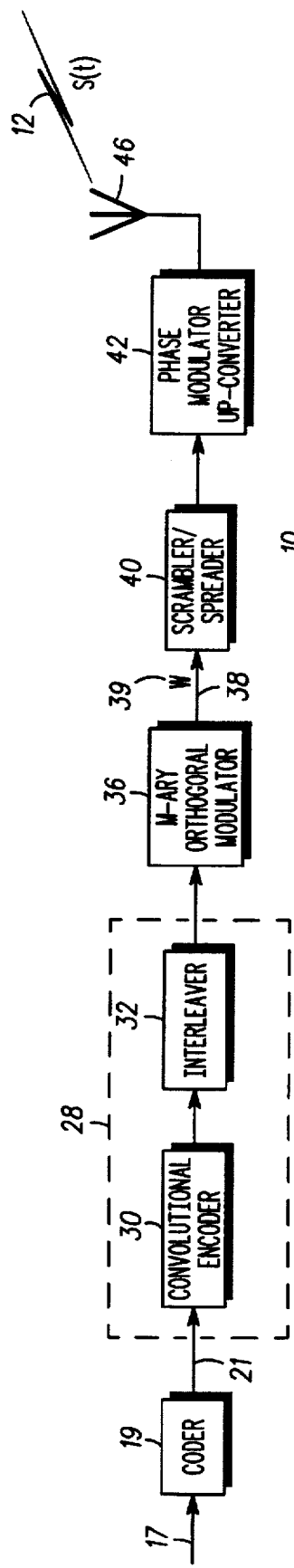
FIG. 3 is a block diagram of a mobile station transmitter for generating a communication signal waveform.

FIG. 3 is a block diagram of a transmitter 10, for use in a mobile station such as mobile station 216, for generating second signal 215. A data bit stream 17 enters a variable-rate coder 19, which produces a signal 21 comprised of a series of transmit channel frames (discussed further below) having varying transmit data rates. The transmit data rate of each frame depends on the characteristics of data bit stream 17.

Figure 4:
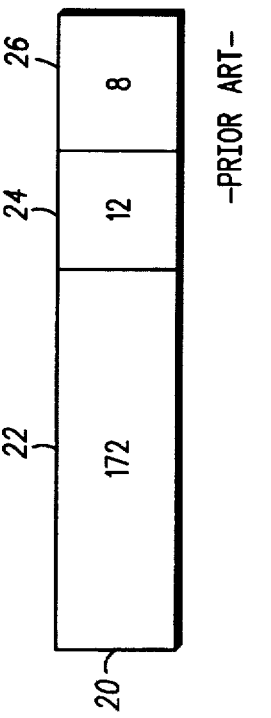
FIG. 4 is a diagram of a reverse-link channel frame for transmission at a rate of 9600 bits per second.

FIG. 4 is a diagram of a transmit channel frame 20, produced by coder 19, for transmission at a rate of 9600 bits per second (bps) (unless otherwise specified, all IS-95 reverse-link channel examples herein correspond to a 9600 bps transmission rate). Frame 20 includes: an information portion 22 having 172 information bits; a frame quality indicator portion 24, calculated from information portion 22 according to a polynomial set forth in IS-95, at sec. 6.1.3.3.2.1 of IS-95; and eight encoder tail bits 26.

Referring to FIG. 3, encoder block 28 includes a convolutional encoder 30 and an interleaver 32. At convolutional encoder 30, each frame 20 may be encoded by a rate ⅓ encoder using well-known algorithms such as convolutional encoding algorithms which facilitate subsequent decoding of frames 20. Interleaver 32 operates to shuffle the contents of frames 20 using commonly-known techniques such as block interleaving techniques.

Figure 5:
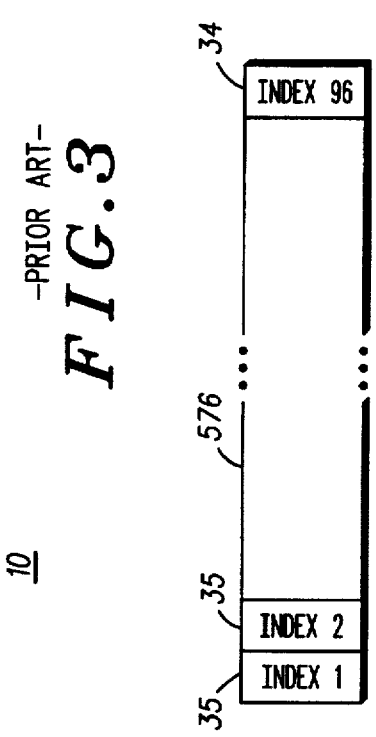
FIG. 5 is a diagram of a digitally encoded and interleaved frame created by the transmitter of FIG. 3.

As shown in FIG. 5, each frame 34 of digitally coded and interleaved bits includes ninety-six groups of six coded bits, for a total of 576 bits. Each group of six coded bits represents an index 35 to one of sixty-four symbols such as Walsh codes. A Walsh code corresponds to a single row or column of a sixty-four-by-sixty-four Hadamard matrix, a square matrix of bits with a dimension that is a power of two. Typically, the bits comprising a Walsh code are referred to as Walsh chips.

Referring again to FIG. 3, each of the ninety-six Walsh code indices 35 in frame 34 are input to an M-ary orthogonal modulator 36, which is preferably a sixty-four-ary orthogonal modulator. For each input Walsh code index 35, M-ary orthogonal modulator 36 generates at output 38 a corresponding sixty-four-bit Walsh code W 39. Thus, a series of ninety-six Walsh codes W 39 is generated for each frame 34 input to M-ary orthogonal modulator 36.

Scrambler/spreader block 40, among other things, applies a pseudorandom noise (PN) sequence to the series of Walsh codes W 39 using well-known scrambling techniques. At block 42, the scrambled series of Walsh codes W 39 is phase modulated using an offset binary phase-shift keying (BPSK) modulation process or another modulation process, up-converted and transmitted as communication signal S(T) 12 from antenna 46.

Figure 6:
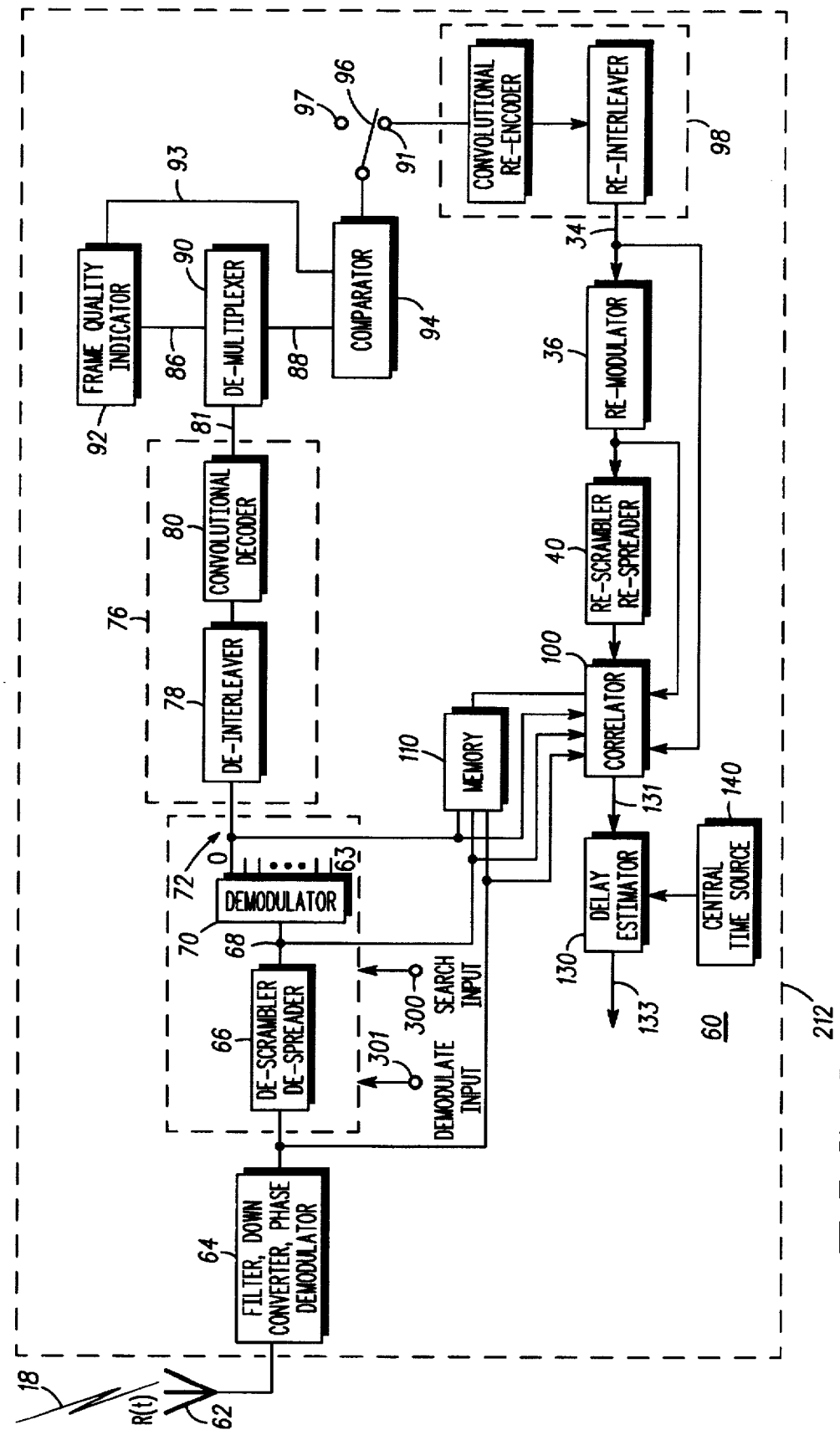
FIG. 6 is a partial block diagram of a base station, including a receiver, for receiving the communication signal waveform generated by the transmitter depicted in FIG. 3, according to a preferred embodiment of the present invention.

FIG. 6 is a partial block diagram of base station 212 (shown in FIG. 2), including a receiver 60, constructed according to a preferred embodiment of the present invention. Base stations 210 and 214 are similarly constructed. Receiver 60 may detect a communication signal R(T) 14, such as second signal 215, traveling from mobile station 216 to base station 212. Receiver 60 is preferably a RAKE receiver having a number of fingers, although only a single finger is shown. Receiver 60 may be coherent, non-coherent or quasi-coherent.

Antenna 62 receives communication signal R(T) 18, which comprises a number of received frames (discussed further below). Front-end processing such as filtering, frequency down-converting and phase demodulation of communication signal R(T) 18 is performed by well-known methods and circuits at block 64.

When search input 300 is selected, receiver 60 operates as a searcher, the operation and construction of searchers being generally well-known, in an effort to lock onto received signal R(T) 18 at approximately the time of reception of R(T) 18. Receiver 60 looks for R(T) 18 at a plurality of time offsets. Once receiver 60 has locked onto signal R(T) 18 at the time offset which approximates the actual time of reception of R(T) 18, receiver 60 may activate demodulate input 301, and reassign the RAKE finger based on the best estimate of the time of reception of signal R(T) 18.

De-scrambler/de-spreader block 66, among other things, removes the PN code applied by scrambler block 44 (shown in FIG. 3) to the series of Walsh codes W 39 (also shown in FIG. 3). In the IS-95 reverse-link channel, a received frame (discussed further below) of received signal 18 includes ninety-six received symbols, or Walsh codes, which are each sixty-four bits long.

Figure 7:
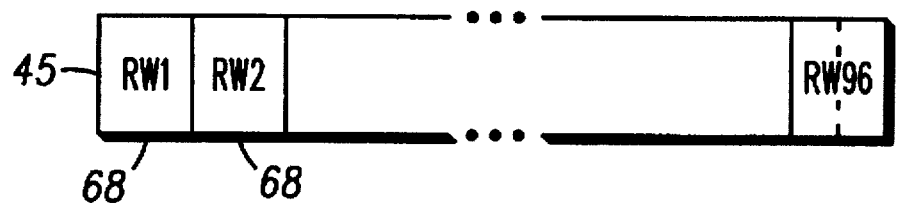
FIG. 7 is a diagram of a received frame in the receiver illustrated in FIG. 6.

FIG. 7 is a diagram representing a received frame 45 that has emerged from de-scrambler/de-spreader block 66. Received frame 45 includes ninety-six groups of sixty-four received signal samples, each group of received signal samples RS 68 corresponding to a transmitted Walsh code. Each group of signal samples has been corrupted by, for example, a slowly-changing channel parameter such as time delay D 14 (shown in FIG. 1) and a channel variable such as N 16 (also shown in FIG. 1).

Referring again to FIG. 6, each received group of received signal samples RS 68, after leaving de-scrambler/de-spreader 66, is input to an orthogonal demodulator 70, such as a Fast Hadamard Transform (FHT). FHT 70 may be implemented using commercially available hardware as an array of adders or as a multiplexed adder, depending on its size. Alternatively, FHT 70 may be implemented utilizing a conventional digital signal processor (DSP) such as a Motorola DSP, part no. 56166 or an application specific integrated circuit (ASIC).

Upon receiving a group of received signal samples RS 68, FHT 70 generates a number of output signals 72. Sixty-four output signals 72 are generated per signal sample group RS 68 in the IS-95 reverse-link channel. Each output signal 72 has an index which references one of the sixty-four possible Walsh codes W 39 generated by M-ary orthogonal modulator 36 (shown in FIG. 3). Thus, in the IS-95 reverse link channel, when a received signal sample group RS 68 is input to FHT 70, sixty-four output signals 72 which correlate to sixty-four possible transmitted Walsh codes 39 are produced. It should be understood that in addition to having an index, each output signal 72 also has an associated complex number, C. For simplicity, the index and the complex number will be referred to collectively as output signal 72.

Each output signal 72 further has an associated energy value $C^2$ (not shown), commonly calculated by magnitude-squaring the complex number C associated with output signal 72. The energy value $C^2$ generally corresponds to a measure of confidence, or a likelihood, that output signal 72 indexes a Walsh code W 39 which corresponds to a group of received signal samples RS input to FHT 70. In about twenty percent of the cases, however, the energy value $C^2$ representing the highest measure of confidence is wrong—that is, output signal 72 associated with the greatest energy value $C^2$ does not actually index a Walsh code W 39 which was transmitted. Decoder block 76, which may include a de-interleaver 78 and a convolutional decoder 80, further demodulates received signal R(T) 18, that is, second signal 215, estimating transmitted signal S(T) (shown in FIG. 3), which is comprised of a series of channel frames, to form a series of demodulated frames (discussed further below). Decoder block 76 may be implemented in a variety of ways. For example, a Maximum Likelihood decoder, implemented in hardware or software according to well-known methods, may be used within decoder block 76.

Figure 8:
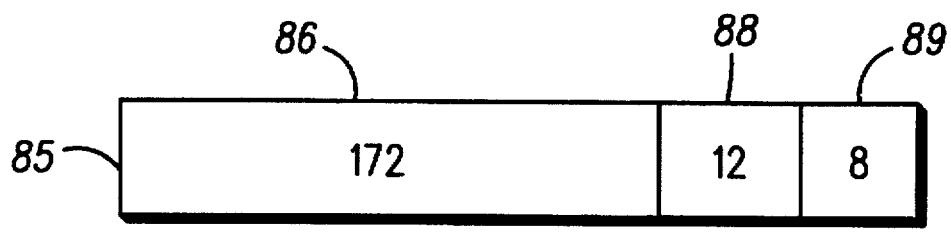
FIG. 8 is a diagram of a demodulated frame in the receiver illustrated in FIG. 6.

FIG. 8 illustrates a demodulated frame 85 which appears at output 81 of decoder block 76. Demodulated frame 85 includes a demodulated information portion 86, a demodulated frame quality indicator 88, and may also include a demodulated tail bit portion 89.

Referring again to FIG. 6, and also to other figures as necessary, a demultiplexer 90 separates demodulated information portion 86 of frame 85 from demodulated frame quality indicator 88. Frame quality indicator circuit 92 uses demodulated portion 86 to calculate a re-computed frame quality indicator 93. Re-computed frame quality indicator 93 is then compared to demodulated frame quality indicator 88 at comparator 94, to determine whether a particular demodulated frame 85 matches a particular channel frame 20 produced by coder 19.

When demodulated frame 85 does not match channel frame 20, it fails, and is discarded by switch 96 at point 97.

When demodulated frame 85 matches transmit channel frame 20, demodulated frame 85 passes. As shown in FIG. 6, demodulated frame 85 has passed. Demodulated information portion 86 is passed by switch 96 at point 91 to re-encoder block 98, which is preferably substantially similar to encoder block 28, depicted in FIG. 3. Thus, an encoded frame 34 exiting re-encoder block 98 is essentially a reproduction of frame 34 (shown in FIG. 5), which may be referred to as a reference frame or a reference signal. As illustrated in FIG. 5, encoded frame 34 includes up to ninety-six groups of six coded bits, each group of six coded bits representing an index 35 to one of sixty-four Walsh codes.

If demodulated frame 85 has been successfully decoded, and communication signal S(T) 12 has been retrieved, base station 212 would have obtained a good estimate of channel parameter information such as time delay D 14 from which the distance between mobile station 216 and base station 212 could be determined. To accurately determine the location of mobile 216 using the trilateration method, however, it is desirable to know the distances between mobile station 216 and at least two other base stations, such as base stations 210 and 214. These distances may be determined from time delays of a communication signal such as signals 215 or 217 transmitted from mobile station 216 to base stations 210 and 214.

To determine time delays of a communication signal from mobile station 216 to all three base stations 210, 212 and 214, base station 212 may, according to one embodiment of the present invention, re-transmit first signal 213 to mobile station 216, receiving in response a retransmitted second signal 217, substantially identical to originally transmitted second signal 215. Base station 212 may communicate originally transmitted second signal 215, present at output 81 of decoder block 76, or may alternatively communicate the reference signal which has been output as re-encoded frame 34 from block 98, to base stations 210 and 214. Base stations 210 and 214 also receive retransmitted signal 217. Then, receiver 60 in all three base stations may operate as a special searcher to accurately determine the time delays of communication signal 217 between mobile station 216 and base stations 210, 212 and 214.

Assuming that the reference signal was forwarded to base stations 210 and 214, receiver 60 may re-M-ary orthogonally modulate each of the ninety-six Walsh code indices 35 in re-encoded frame 34. For each input Walsh code index 35, a sixty-four-bit signal sample group, or Walsh code, is generated. Thus, a series of ninety-six Walsh codes is generated for each frame 34. Optionally, the M-ary orthogonally modulated signal may be re-scrambled and re-spread by applying a PN sequence to the series of Walsh codes using well-known scrambling techniques. The re-modulation and re-scrambling/spreading processes are preferably substantially similar to the corresponding processes in transmitter 10 of mobile station 216, described in connection with FIG. 3.

The re-modulated indices 35 are then correlated with the received signal samples RS 68 associated with communication signal 217 at a plurality of time offsets. The time offset at which re-transmitted second signal 217 and re-encoded originally-transmitted second signal 215 have a high degree of correlation may be output from correlator 100 at line 131.

Alternatively, correlator 100 may compare, at a plurality of time offsets, a particular encoded index 35 (shown in FIG. 5) of a particular frame 34 received from re-encoder block 98 to re-transmitted second signal 217 at the point where an output signal 72 corresponding to the particular index corresponding to encoded index 35 exits FHT 70. The time offset at which a frame of re-transmitted second signal 217 and a frame of re-encoded originally-transmitted second signal 215 has a high degree of correlation may be output from correlator 100 at line 131.

The time delays D 14, and hence the distances, between mobile station 216 and each base station 210, 212 and 214 may be determined by comparing, at block 130, the time offsets at which the high degree of correlation occurred with a central time source 140.

To obtain an accurate delay estimation under low signal-to-noise ratio (SNR), the signals to be correlated may span a time duration much longer than the channel coherent time, and the special search process may be realized in two steps. In the case where re-modulated indices 35 are correlated with received signal samples RS 68 associated with communication signal 217, received signal samples 68 and re-modulated indices 35 are first each divided into a plurality of segments, preferably of equal length, each segment spanning a time duration less than the channel coherent time, and correlations are performed over each pair of segments. Second, the correlation results, which are complex numbers, are magnitude-squared and summed together to form the final search results. The second step may be referred to as non-coherent combining.

In the case where correlator 100 compares a particular encoded index 35 from re-encoder block 98 to re-transmitted second signal 217 at the point where an output signal 72 corresponding to the particular index corresponding to encoded index 35 exits FHT 70, the special search process may be performed using FHT 70. The received signal sample groups exiting de-scrambler/de-spreader block 66 are divided into a plurality of segments, each of which spans a time duration less than the channel coherent time. Each group of received signal samples is processed by FHT 70 and the complex number output C with the index equal to the corresponding re-encoded 6-bit group is selected. Within a segment, these selected FHT outputs are summed to form a combined complex FHT output. The combined complex FHT output is magnitude-squared and summed with the magnitude-squared combined complex FHT outputs from other segments to form the final search results.

According to another embodiment of the present invention, mobile station 216 does not transmit signal 217. A memory 110, which may be a commercially available computer-readable random-access memory, for example, may be positioned at a point within receiver 60 in base stations 210, 212 and 214 to capture second signal 215 as it is received. As shown in FIG. 6, memory 110 is responsive to front end processing block 64, to descrambler/despreader block 66 and to demodulator 70, although it may also be responsive to other receiver elements. Then, search processes as described herein may be performed for the captured second signal in base stations 210, 212 and 214 to determine the time delays, or the distances, between mobile station 216 and the base stations. The estimated memory size is 0.5 Mbytes per 0.1 second of samples, when the number of samples stored is two times the Walsh chip rate.

It is also contemplated that second signal 215 may be any normal traffic signal transmitted by mobile station 216, without the preceding transmission of first signal 213 from base station 212. In this case, base stations 210, 212 and 214 would preferably store signal 215 at a common predetermined time. It may be desirable, however, to direct mobile station 216 to transmit at a full-rate, for example, by sending first signal 213 to request that mobile station 216 transmit a blank-and-burst or dim-and-burst signal, to ensure that signal 215 includes full-rate frames. A method for determining time delay D 14 resulting from second signal 215 or 217 traveling between mobile station 216 and base station 212 may be summarized as follows: a delayed signal R(T) 18 represented at the output of FHT 70 as a number of stored output signals 72 is known, either having been (1) retransmitted as second signal 217 by mobile station 216, or (2) transmitted by mobile station 216 as signal 215 and captured in memory 110. Values of S(T) 12 corresponding to R(T) 18 are given by indices 35 of encoded frames 34 exiting re-encoder block 98. Correlator 100 correlates the received signals and the re-modulated and/or re-spread and re-scrambled signals, or, as the case may be, determines differences between output signals 72 and matching corresponding indices 35, and forwards to delay estimator 130 at line 131 the time offset at which correlation between a frame of R(T) 18 and a frame of S(T) 12 is high. Calculation of the correct time offset for a particular frame is generally corrupted only by an amount of noise N 16. To reduce energy from noise N 16, the time offset calculations may be performed over a period of time, for example, for several frames.

Then, at delay estimator block 130, the selected time offset at line 131 is compared with a central time source 140, such as a 20 millisecond integral multiple of the IS-95 System Time available at base station 212, to estimate time delay D 14 of second signal 215 or 217 from mobile station 216 to base stations 210, 212 and 214.

When it is desired to determine a location of mobile station 216, a controller, such as base station controller 250 or mobile station controller 260, may initiate a command to one or more base stations such as base stations 210, 212 and 214 to determine time delay D 14 of a signal 215 or 217 traveling from mobile station 216 to base stations 210, 212 and 214, as described above. Then, time delays D 14 calculated by each base station may be forwarded, along with base station identification information, to a central location such as base station controller 250 or mobile switching center 260. Location of mobile station 216 may be determined by considering time delays D 14 for each base station, along with the two- or three-dimensional geographic coordinates of the receiving base stations, and calculating the unique point (or small region of highest probability) where the signal propagation paths between the base stations and the mobile station intersect. For example, a suitable calculation for determining the geographic coordinates of mobile station 216 is provided in U.S. Pat. No. 5,508,708 to Ghosh et al., incorporated herein by reference.

Figure 9:
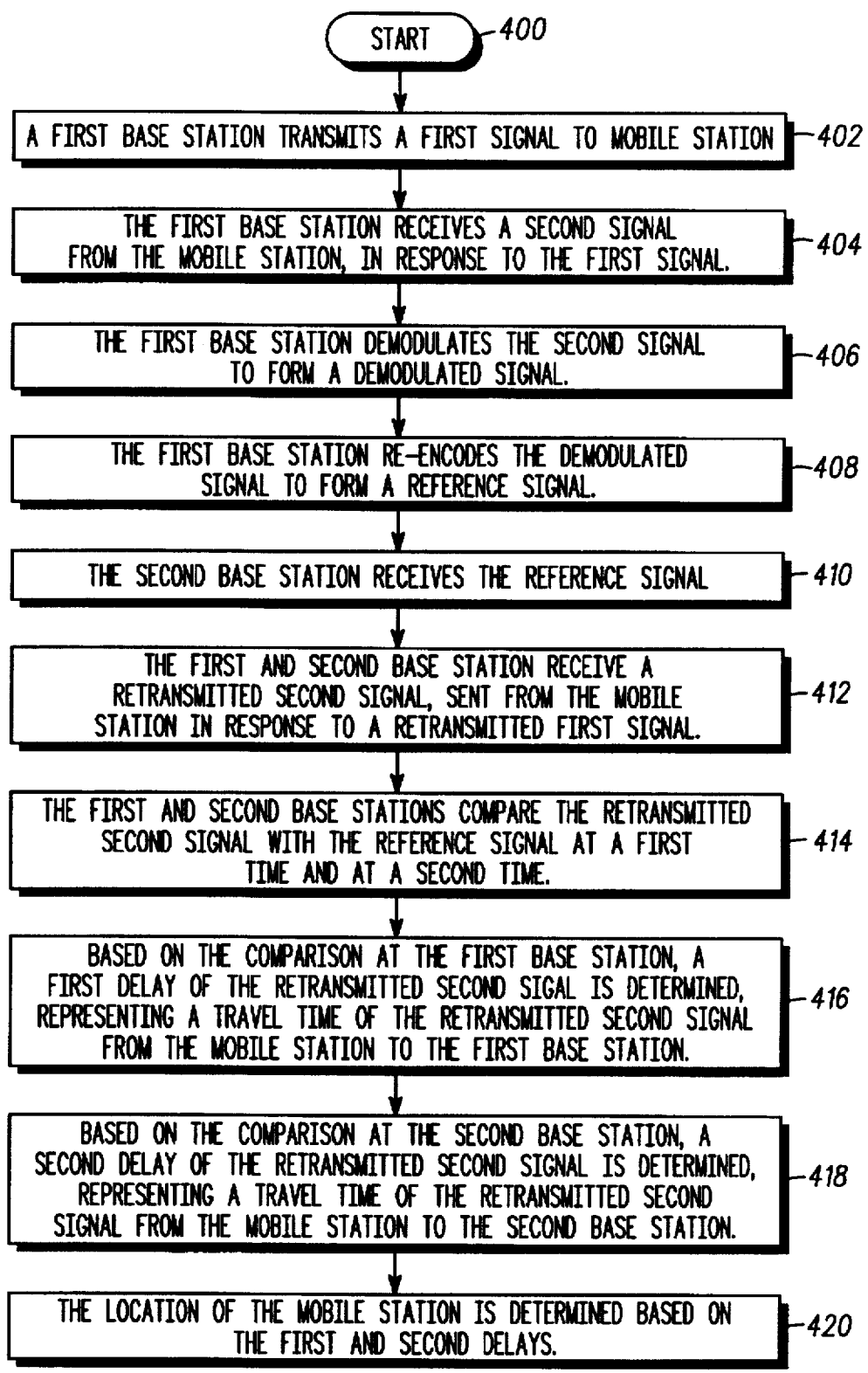
FIG. 9 is a flowchart of a method for determining a location of a mobile station in a spread spectrum communication system according to a preferred embodiment of the present invention.

One preferred method for determining a location of a mobile station in a spread spectrum communication system is outlined in the flowchart of FIG. 9. The method starts at block 400, and continues to block 402, where a first base station transmits a first signal to a mobile station. At block 404, the first base station receives a second signal from the mobile station, in response to the first signal. Next, at block 406, the first base station demodulates the second signal to form a demodulated signal, and at block 408 the first base station re-encodes the demodulated signal to form a reference signal. The second base station receives the reference signal at block 410. The first and second base stations receive a retransmitted second signal at block 412, the retransmitted second signal sent from the mobile station in response to a retransmitted first signal directed to the mobile station. At block 414, the first and second base stations compare the retransmitted second signal with the reference signal at a first time and at a second time. Based on the comparisons at the first base station, at block 416, a first delay of the retransmitted second signal is determined, the first delay representing a travel time of the retransmitted second signal from the mobile station to the first base station. At block 418, based on the comparisons at the second base station, a second delay of the retransmitted second signal is determined, the second delay representing a travel time of the retransmitted second signal from the mobile station to the second base station. At block 420, the location of the mobile station is determined based on the first and second delays.

In a first alternative embodiment, the second base station may receive the demodulated signal and both the first base station and the second base station may re-modulate the demodulated signal to form the reference signal. In a second alternative embodiment, both the first and second base stations may store the first signal in a memory such as memory 110, demodulate the first signal to form a demodulated signal, re-modulate the demodulated signal, and compare the re-modulated signal with the contents of the memory.

The methods and apparatuses for locating a mobile station in a spread spectrum communication system described herein have many advantages. For example, base station receivers 60 have prior knowledge of the exact signal S(T) 12, for example, signal 215 or 217 transmitted by mobile station 216. Thus, a receiver 60 operating as a searcher may determine time delay D 14 associated with received signal R(T) by correlating signal R(T) 18 with transmitted signal S(T) 12 at a number of offset times over a long integration period, for example, over two or more frames. This method may result in signal-to-noise ratio (SNR) gains of up to 12 dB, and should significantly shrink coverage holes.

On the other hand, lengthening the integration period without prior knowledge of S(T) 12 would yield little improvement in estimation of time delay D 14, and should not reduce coverage holes, because receiver 60 would have to use the well-known winning Walsh symbol method to estimate delay D 14 under low SNR conditions.

Although receiver 60 has been described herein in terms of specific logical/functional circuitry and relationships, it is contemplated that receiver 60 may be configured in a variety of ways, such as with programmed processors or application-specific integrated circuits (ASICs).

The IS-95 reverse link channel has been specifically referred to herein, but the present invention is applicable to any digital channel, including but not limited to the forward-link IS-95 channel and to all forward- and reverse-link TDMA channels, in all TDMA systems, such as Groupe Special Mobile (GSM), a European TDMA system, Pacific Digital Cellular (PDC), a Japanese TDMA system, and Interim Standard 54 (IS-54), a U.S. TDMA system.

The principles of the present invention which apply to cellular-based digital communication systems may also apply to other types of communication systems, including but not limited to personal communication systems, trunked systems, satellite communication systems and data networks. Likewise, the principles of the present invention which apply to all types of digital radio frequency channels also apply to other types of communication channels, such as radio frequency signaling channels, electronic data buses, wireline channels, optical fiber links and satellite links.

It will furthermore be apparent that other and further forms of the invention, and embodiments other than the specific embodiments described above, may be devised without departing from the spirit and scope of the appended claims and their equivalents, and therefore it is intended that the scope of this invention will only be governed by the following claims and their equivalents.

We claim:

1. A method for locating a mobile station in a spread spectrum communication system, the method comprising the steps of:

transmitting a first signal comprising a plurality of transmitted symbols from a first base station to the mobile station;

receiving by the first base station from the mobile station a second signal comprising a first plurality of received symbols in response to the first signal;

demodulating the second signal by the first base station to form a demodulated signal;

reencoding at least a portion of the demodulated signal by the first base station to form a reference signal;

receiving the reference signal by a second base station;

receiving by the first base station and the second base station a retransmitted second signal comprising a second plurality of received symbols from the mobile station, the retransmitted second signal in response to a retransmitted first signal comprising a plurality of retransmitted symbols directed to the mobile station;

comparing, by the first base station, the retransmitted second signal with the reference signal at a first time and at a second time;

comparing, by the second base station, the retransmitted second signal with the reference signal at the first time and at the second time;

based on the comparisons at the first base station, determining a first delay of the retransmitted second signal, the first delay representing a travel time of the retransmitted second signal from the mobile station to the first base station;

based on the comparisons at the second base station, determining a second delay of the retransmitted second signal, the second delay representing a travel time of the retransmitted second signal from the mobile station to the second base station; and based on the first and second delays, determining a location of the mobile station.

2. The method according to claim 1, wherein the step of determining the location of the mobile station further comprises the step of:

utilizing predetermined information about the first and second base stations.

3. The method according to claim 2, wherein the predetermined information comprises one of three-dimensional geographic coordinates of the first and second base stations and two-dimensional geographic coordinates of the first and second base stations.

4. The method according to claim 1, wherein the first signal and the retransmitted first signal are transmitted on a paging channel of a code division multiple access (CDMA) communication system.

5. The method according to claim 1, wherein the second signal and the retransmitted second signal are transmitted on an access channel of a CDMA communication system.

6. The method according to claim 1, wherein the first and second signals and the first and second retransmitted signals are transmitted on a traffic channel of a CDMA communication system.

7. The method according to claim 1, further comprising the step of:

directing, by a central controller, the first base station to transmit the first signal.

8. The method according to claim 1, wherein the step of demodulating the second signal further comprises the step of:

inputting one of the first plurality of received symbols to a first demodulator associated with the first base station, the first demodulator having a number of outputs, each of the number of outputs having a value.

9. The method according to claim 8, wherein each value represents a likelihood that the one of the first plurality of received symbols corresponds to one of the plurality of transmitted symbols.

10. The method according to claim 8, wherein the first demodulator comprises a Fast Hadamard Transform (FHT).

11. The method according to claim 8, wherein each of the number of outputs comprises a Walsh code index.

12. The method according to claim 8, wherein each of the number of outputs comprises a complex number.

13. The method according to claim 1, further comprising the steps of:

prior to comparing by the first base station, dividing the reference signal into a plurality of segments to form a divided reference signal having a plurality of segments; and dividing the retransmitted second signal into a plurality of segments to form a divided retransmitted second signal having a plurality of segments.

14. The method according to claim 13, wherein each of the plurality of segments of the divided reference signal and each of the plurality of segments of the divided retransmitted second signal comprise a length which is less than a channel coherent time.

15. The method according to claim 13, wherein the step of comparing by the first base station at the first time further comprises the step of:

comparing a first segment of the plurality of segments of the divided reference signal with a first segment of the plurality of segments of the divided retransmitted second signal to form a first correlation result; and comparing a second segment of the plurality of segments of the divided reference signal with a second segment of the plurality of segments of the divided retransmitted second signal to form a second correlation result.

16. The method according to claim 15, wherein the first correlation result and the second correlation result comprise complex numbers.

17. The method according to claim 16, further comprising the steps of:

magnitude-squaring the first correlation result;

magnitude-squaring the second correlation result; and summing the magnitude-squared first correlation result and the magnitude-squared second correlation result to form a final search result.

18. A method for locating a mobile station in a spread spectrum communication system, the method comprising the steps of:

receiving by a first base station a signal transmitted from the mobile station;

demodulating the signal by the first base station to form a demodulated signal;

remodulating at least a portion of the demodulated signal to form a reference signal;

receiving by the first base station and a second base station a retransmitted signal;

comparing, by the first base station, the retransmitted signal with the reference signal to determine a first delay;

comparing, by the second base station, the retransmitted second signal with the reference signal to determine a second delay; and based on the first and second delays, determining a location of the mobile station.

19. An apparatus for locating a mobile station in a spread spectrum communication system, the apparatus comprising:

a first base station responsive to the mobile station, the first base station comprising:

a first antenna transmitting a first signal to the mobile station, the first antenna receiving a second signal from the mobile station in response to the first signal;

a first demodulator responsive to the second signal, producing a demodulated signal;

a reencoder responsive to the demodulated signal, forming a reference signal;

a first correlator, comparing the reference signal to a retransmitted second signal received by the first antenna to determine a first delay, the first delay representing a travel time of the retransmitted second signal from the mobile station to the first base station;

a second base station responsive to the mobile station and the reference signal, the second base station comprising:

a second antenna receiving the retransmitted second signal from the mobile station and receiving the reference signal;

a second correlator, comparing the reference signal to the retransmitted second signal to determine a second delay, the second delay representing a travel time of the retransmitted second signal from the mobile station to the second base station; and a controller responsive to the first and second base stations, the controller determining a location of the mobile station based on the first delay and the second delay.

20. A method for locating a mobile station in a spread spectrum communication system, the method comprising the steps of:

receiving by a first base station a signal transmitted by the mobile station, the signal comprising a received frame, the received frame having a plurality of received symbols;

storing the signal by the first base station in a first memory;

receiving the signal by a second base station;

storing the signal by the second base station in a second memory;

demodulating the received frame by the first base station to form a demodulated frame;

receiving the demodulated frame by the second base station;

at the first base station, reencoding the demodulated frame to form a reencoded frame, the reencoded frame having a plurality of encoded symbols;

at the second base station, reencoding the demodulated frame to form the reencoded frame;

at the first base station, comparing at a first plurality of times each of the plurality of received symbols in the first memory with each of the plurality of reencoded symbols;

based on the comparisons at the first plurality of times, determining a first delay representing a travel time of the signal from the mobile station to the first base station;

at the second base station, comparing at a second plurality of times each of the plurality of received symbols in the second memory with each of the plurality of reencoded symbols;

based on the comparisons at the second plurality of times, determining a second delay representing a travel time of the signal from the mobile station to the second base station; and based on the first and second delays, determining a location of the mobile station.

* * * * *